United States Patent
Wang et al.

(10) Patent No.: US 12,493,084 B2
(45) Date of Patent: Dec. 9, 2025

(54) METHODS FOR MOUNTING AND TESTING A CENTRAL COMMUNICATION CABLE ASSEMBLY OF A DIRECTIONAL DRILL ROD

(71) Applicants: Shanxi Jinding Gaobao Drilling Co., Ltd., Jincheng (CN); Jinneng Holding Equipment Manufacturing Group, Jincheng (CN)

(72) Inventors: Hongqing Wang, Jincheng (CN); Baotong Gao, Jincheng (CN); Jianrong Du, Jincheng (CN); Linbo Li, Jincheng (CN); Tianju Yang, Jincheng (CN); Jian Sheng, Jincheng (CN); Xusheng Huang, Jincheng (CN); Yanlong Li, Jincheng (CN); Taotao Li, Jincheng (CN); Xiaofei Zhang, Jincheng (CN); Zhiliang Cheng, Jincheng (CN); Ruibin Ren, Jincheng (CN); Xiang Zhao, Jincheng (CN); Songnan Guo, Jincheng (CN); Hao Zhang, Jincheng (CN); Jinjie Zhang, Jincheng (CN); Kaikai Lang, Jincheng (CN)

(73) Assignees: SHANXI JINDING GAOBAO DRILLING CO., LTD., Jincheng (CN); JINNENG HOLDING EQUIPMENT MANUFACTURING GROUP, Jincheng (CN)

( * ) Notice: Subject to any disclaimer, the term of this patent is extended or adjusted under 35 U.S.C. 154(b) by 139 days.

(21) Appl. No.: 18/687,890

(22) PCT Filed: Aug. 10, 2022

(86) PCT No.: PCT/CN2022/111391
§ 371 (c)(1),
(2) Date: Feb. 29, 2024

(87) PCT Pub. No.: WO2023/029910
PCT Pub. Date: Mar. 9, 2023

(65) Prior Publication Data
US 2025/0012873 A1    Jan. 9, 2025

(30) Foreign Application Priority Data
Sep. 1, 2021 (CN) .......................... 202111019730.2

(51) Int. Cl.
*G01R 31/58* (2020.01)
*E21B 7/04* (2006.01)
(Continued)

(52) U.S. Cl.
CPC ................ *G01R 31/58* (2020.01); *E21B 7/04* (2013.01); *E21B 17/0285* (2020.05); *G01R 31/1272* (2013.01)

(58) Field of Classification Search
CPC .......... G01R 31/12; G01R 31/58; E21B 7/04; E21B 17/02; E21B 17/20
See application file for complete search history.

(56) References Cited

FOREIGN PATENT DOCUMENTS

| CN | 113884947 A | 1/2022 |
| CN | 221546892 | * 8/2024 ........... E21B 17/042 |

OTHER PUBLICATIONS

International Search Report in Corresponding International Application No. PCT/CN2022/111391, mailed Nov. 1, 2022; 7 pgs.
(Continued)

*Primary Examiner* — Neel D Shah
(74) *Attorney, Agent, or Firm* — HAUPTMAN HAM, LLP

(57) ABSTRACT

The present application relates to the technical field of directional drill rod assembly, and discloses methods for
(Continued)

mounting and testing a central communication cable assembly of a directional drill rod, the mounting method including: according to drawing requirements, mounting an O-shaped sealing member in a sealing groove of an insulating male connector, an insulating female connector, a communication cable direct connector and a communication cable tapered connector, and processing, connecting, and mounting the various components. By means of the method, the central communication cable assembly of a directional drill rod is mounted, and the product quality stability is good.

9 Claims, 5 Drawing Sheets

(51) Int. Cl.
  *E21B 17/02* (2006.01)
  *E21B 17/20* (2006.01)
  *G01R 31/12* (2020.01)

(56) References Cited

OTHER PUBLICATIONS

Written Opinion in Corresponding International Application No. PCT/CN2022/111391, mailed Nov. 1, 2022; 9 pgs.

* cited by examiner

METHODS FOR MOUNTING AND TESTING A CENTRAL COMMUNICATION CABLE ASSEMBLY OF A DIRECTIONAL DRILL ROD

RELATED APPLICATIONS

The present application is a U.S. National Phase of International Application Number PCT/CN2022/111391 filed Aug. 10, 2022, which claims priority to Chinese Application Number 202111019730.2 filed Sep. 1, 2021.

TECHNICAL FIELD

The present application belongs to the technical field of directional drill rod assembly, and specifically discloses methods for mounting and testing a central communication cable assembly of a directional drill rod.

BACKGROUND

A communication cable directional drill rod in a coal-mining long-drilled directional drilling system is one of the key components, which uses a wired communication cable manner to ensure bidirectional communication between a bottom device and an orifice device, so as to achieve timely track deviation correction and ensure directional drilling construction quality and efficiency, having advantages such as high data transmission efficiency and strong interference resistance.

The central communication cable of a directional drill rod undertakes the functions of continuous monitoring a drilling trajectory and bidirectional transmission of measurement-while-drilling and control signals, during a drilling operation, high-pressure water of which the frequency and amplitude continuously change is outside a communication cable assembly, and a conductor element for transmitting communication signals is sealed inside; if the high-pressure water penetrates into a conducting area through an insulating sealing element or the resistance of the conducting copper core increases abnormally, the signals may be attenuated, distorted, discontinuous, or even lost.

The stability of the contact resistance between the conducting components and the performance of the insulating sealing component for isolating high-pressure water both directly affect the operational stability of the directional drilling system, and a manufacturing stage and an assembling process of components of the communication cable assembly are two key stages of quality control.

Currently, there is no method for mounting and testing a central communication cable assembly of a directional drill rod.

SUMMARY

The object of the present application is to provide methods for mounting and testing a central communication cable assembly of a directional drill rod, so as to ensure the quality stability of a product.

To achieve the object, the present application provides a method for mounting a central communication cable assembly of a directional drill rod, including the following steps:

S1, according to drawing requirements, mounting an O-shaped sealing member in a sealing groove of an insulating male connector, an insulating female connector, a communication cable direct connector and a communication cable tapered connector;

S2, cleaning the interior and exterior of the drill rod, the groove and threads;

S3, placing the drill rod horizontally on an assembly table, and pushing a three-wing stabilizing frame made of a rubber material into a drill rod hole;

S4, using a spring caliper to respectively mount two circlips for hole into snap spring grooves located at two ends inside the drill rod hole;

S5, inserting a long threaded end of an insulating wire tube into a central hole of the three-wing stabilizing frame until the remaining length of the insulating wire tube outside the hole reaches a preset value;

S6, sleeving a central hole of a stainless steel retaining ring I into a short threaded end of the insulating wire tube;

S7, fixing a non-threaded portion of the insulating wire tube located outside the central hole of the three-wing stabilizing frame, abutting a small-diameter end of the insulating male connector with the short threaded end of the insulating wire tube and then pressing the small-diameter end into the short threaded end, rotating the insulating male connector, and after threads of the insulating male connector are normally screwed into the short threaded end of the insulating wire tube, rotating the insulating male connector until the insulating male connector is tightened;

S8, checking whether the O-shaped sealing member at the connection position of the mounted insulating male connector and insulating wire tube is in good condition, if so, proceeding to the next step, otherwise, disassembling the insulating male connector, and performing re-mounting same according to step S7;

S9, holding the insulating male connector with a hand, pushing same together with the insulating wire tube and the stainless steel retaining ring I into the drill rod hole until the stainless steel retaining ring I is clamped outside the circlip for hole at this side;

S10, sleeving a central hole of a stainless steel retaining ring II into the long threaded end of the insulating wire tube;

S11, fixing the insulating male connector, abutting a small-diameter end of the insulating female connector with the long threaded end of the insulating wire tube and then pressing the small-diameter end into the long threaded end, rotating the insulating female connector, and after threads of the insulating female connector are normally screwed into the long threaded end of the insulating wire tube, rotating the insulating female connector until the insulating female connector is tightened and the stainless steel retaining ring II is clamped outside the circlip for hole at this side;

S12, inserting a communication cable copper core into the hole of the insulating wire tube from a central hole of the insulating male connector or the insulating female connector, wherein the length outside end faces of large-diameter ends of the insulating connectors at two ends is a preset value;

S13, coating a thread fastening agent onto a position between a thread end face and an nth thread of a first end of the communication cable copper core, wherein n is a positive integer less than the total number of threads of the first end or a second end of the communication cable copper core, and the remaining threads are coated with an oxidation-resistant active thread conductive paste so as to fill the threads; fixing a non-threaded portion on the first end of the communication cable copper core; and screwing a threaded hole of the communication cable direct connector or the communication cable tapered connector with a threaded section of the first end of the communication cable copper core;

S14, pushing the mounted communication cable connector and communication cable copper core into the corresponding insulating connector until a gap between the communication cable connector and the insulating connector is eliminated, and at this time, an end face of the communication cable connector being flush with a mating face of the insulating connector at this end;

S15, dropping the thread fastening agent into a threaded hole of an unmounted communication cable connector vertically upwards, and coating the oxidation-resistant active thread conductive paste on threads after an nth thread of the second end of the communication cable copper core, fixing the mounted communication cable connector, and screwing the threaded hole of the unmounted communication cable connector with a threaded section of the second end of the communication cable copper core, until the gap between the communication cable connector and the insulating connector is eliminated, at this time, the end face of the communication cable connector being flush with the mating face of the insulating connector at this end; and S16, mounting a cylindrical end of a conductive spring into a cylindrical hole of the communication cable direct connector.

Further, steps S7 and S11 include using a male connector mounting tool to clamp the insulating male connector, the male connector insulating tool including a grip, a connecting rod and a clamping plate, the clamping plate including two side plates arranged opposite each other and a connecting plate connecting the two side plates, a distance between the side plates matching the large diameter end of the insulating male connector, and the connecting rod being connected to the grip and the clamping plate.

Further, step S11 includes using a female connector mounting tool to clamp the insulating female connector, the female connector mounting tool including a fish-lip pincer and two arc-shaped clamping plates provided on a mouth of the fish-lip pincer, and the inner diameter of the arc-shaped clamping plates matching the large-diameter end of the insulating female connector.

Further, step S7 includes using the fish-lip pincer to clamp and fix the non-threaded portion of the insulating wire tube located outside the central hole of the three-wing stabilizing frame, abutting the small-diameter end of the insulating male connector with the short threaded end of the insulating wire tube and then pressing the small-diameter end into the short threaded end, rotating the insulating male connector by a hand, after the threads of the insulating male connector are normally screwed into the short threaded end of the insulating wire tube, clamping the large-diameter end of the insulating male connector by means of the clamping plate of the male connector mounting tool, and rotating the insulating male connector forward until the insulating male connector is tightened, the torque being 10 N·m.

Further, step S11 includes fixing the insulating male connector by means of the clamping plate of the male connector mounting tool, abutting the small-diameter end of the insulating female connector with the long threaded end of the insulating wire tube and then pressing the small-diameter end into the long threaded end, rotating the insulating female connector by a hand, and after the threads of the insulating female connector are normally screwed into the long threaded end of the insulating wire tube, clamping the large-diameter end of the insulating female connector by means of the arc-shaped clamping plates of the female connector mounting tool, rotating the insulating female connector forward until the insulating female connector is tightened, the stainless steel retaining ring II is clamped outside the circlip for hole at this side, a gap between the insulating female connector and the stainless steel retaining ring II is completely eliminated, the torque being 10 N·m.

Further, steps S13 and S15 include using a communication cable connector mounting tool to mount the communication cable connector, wherein the communication cable connector mounting tool includes a T-shaped rod, and a vertical end portion is a hexagon matching a hexagonal hole of the communication cable connector.

Further, step S13 includes coating a Loctite 263 thread fastening agent onto a position between the threaded end face and the third thread of the first end of the communication cable copper core, coating the remaining threads with the oxidation-resistant active thread conductive paste, clamping and fixing the non-threaded portion on the first end of the communication cable copper core by using a fish-lip pincer, and mounting the communication cable connector including first, rotating the communication cable connector by a few threads forward by a hand, and then inserting a vertical end portion of the communication cable connector mounting tool into the hexagonal hole of the communication cable connector, and screwing the communication cable connector, the torque being 2 N·m.

Further, step S15 includes dropping the Loctite 263 thread fastening agent into the threaded hole of the unmounted communication cable connector vertically upward, coating the oxidation-resistant active thread conductive paste onto the threads after the third thread at the second end of the communication cable copper core, inserting the vertical end portion of the communication cable connector mounting tool into the hexagonal hole of the mounted communication cable connector to fix the mounted communication cable connector, and then taking another communication cable connector mounting tool to screw the threaded hole of the unmounted communication cable connector with the threaded section of the second end of the communication cable copper core, the torque being 2 N·m.

The present application also provides a method for testing a central communication cable assembly of a directional drill rod, including the following steps:

S1, testing, by means of a multimeter and a copper wire mounted with an alligator clip, that the mounted central communication cable assembly of a directional drill rod is in an on state, wherein the multimeter measures whether a resistance value reading between the communication cable connectors at two ends of a single drill rod of three meters is less than or equal to 0.5Ω, and if so, the central communication cable assembly of a directional drill rod is qualified, and if the resistance exceeds a limit, the central communication cable assembly of a directional drill rod needs to be dismounted to investigate and analyze the fault reason;

S2, according to a production batch, performing a random product inspection on the qualified central communication cable assembly of a directional drill rod, wherein a rack inspection includes a pull-out force test, a high-low temperature adaptability test, a static conduction performance test, a hydrostatic pressure sealing performance test, and a static insulation performance test of the communication cable assembly;

the pull-out force test of the communication cable assembly: using a pull-out test machine, fixing a tube body of a tested set of drill rod, clamping an insulating male connector and an insulating female connector and applying an axial traction force of 1000 N for 1 min, and then disassembling the tested drill rod and performing measurement, wherein in the test, no significant deformation or fracture situation should occur in each component of the central communication cable assembly of a directional drill rod;

the high-low temperature adaptability test: placing the tested set of drill rod in a sealed test bin, wherein the various components of the drill rod should not have significant deformation and fracture in a temperature range of −25° C. to 50° C., and a change in a matching size of the insulating male connector and the insulating female connector is recorded every time the ambient temperature changes by 5° C.;

the static conduction performance test: performing a retest by using an electric bridge tester, and connecting and measuring the three sets of drill rods of the same model, wherein the internal resistance of a single drill rod of three meters should be less than or equal to 0.5 Ω;

the static insulation performance test: using a high-voltage pulse generator to test the insulation performance of a conducting component and a housing;

the hydrostatic pressure sealing performance test: connecting three sets of drill rods in the same specification in a threaded manner, mounting test flanges at two ends, using a hydraulic pressure gauge to apply a 12 MPa water pressure to the tested drill rod set, and measuring and recording a pressure gauge and a leakage condition at a threaded connection portion, if the total leakage amount in 10 minutes when the pressure is held is less than or equal to 5 ml, the tested drill rods being qualified, performing the static insulation performance test after the time for holding the pressure ends, then disassembling the central communication cable assembly of a directional drill rod, and if there is no water stain in holes of the insulating male connector and the insulating female connector and an insulating wire tube, the central communication cable assembly of a directional drill rod being qualified.

The present application has the following advantages:

a central communication cable assembly of a directional drill rod is mounted by means of the method provided in the present invention, the product quality stability is good, the time for assembling a single central communication cable assembly of a directional drill rod is 5 min, and the qualified rate is 95%.

Figure 1:
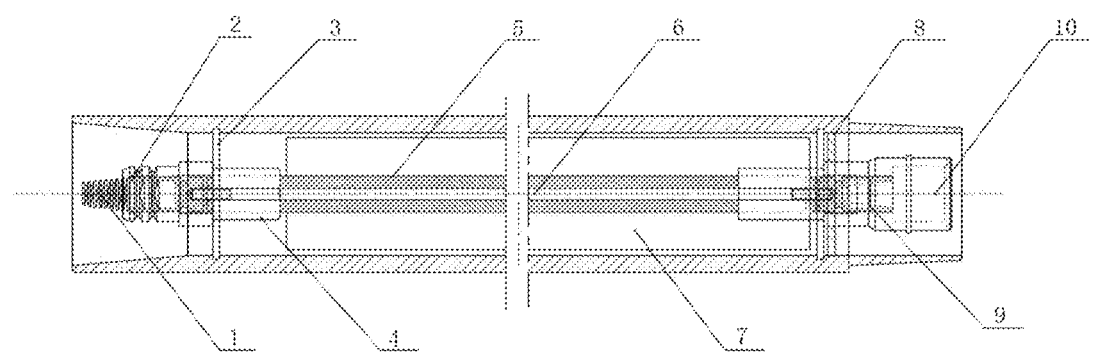
FIG. 1 is a sectional view of a directional drill rod.
Figure 2:
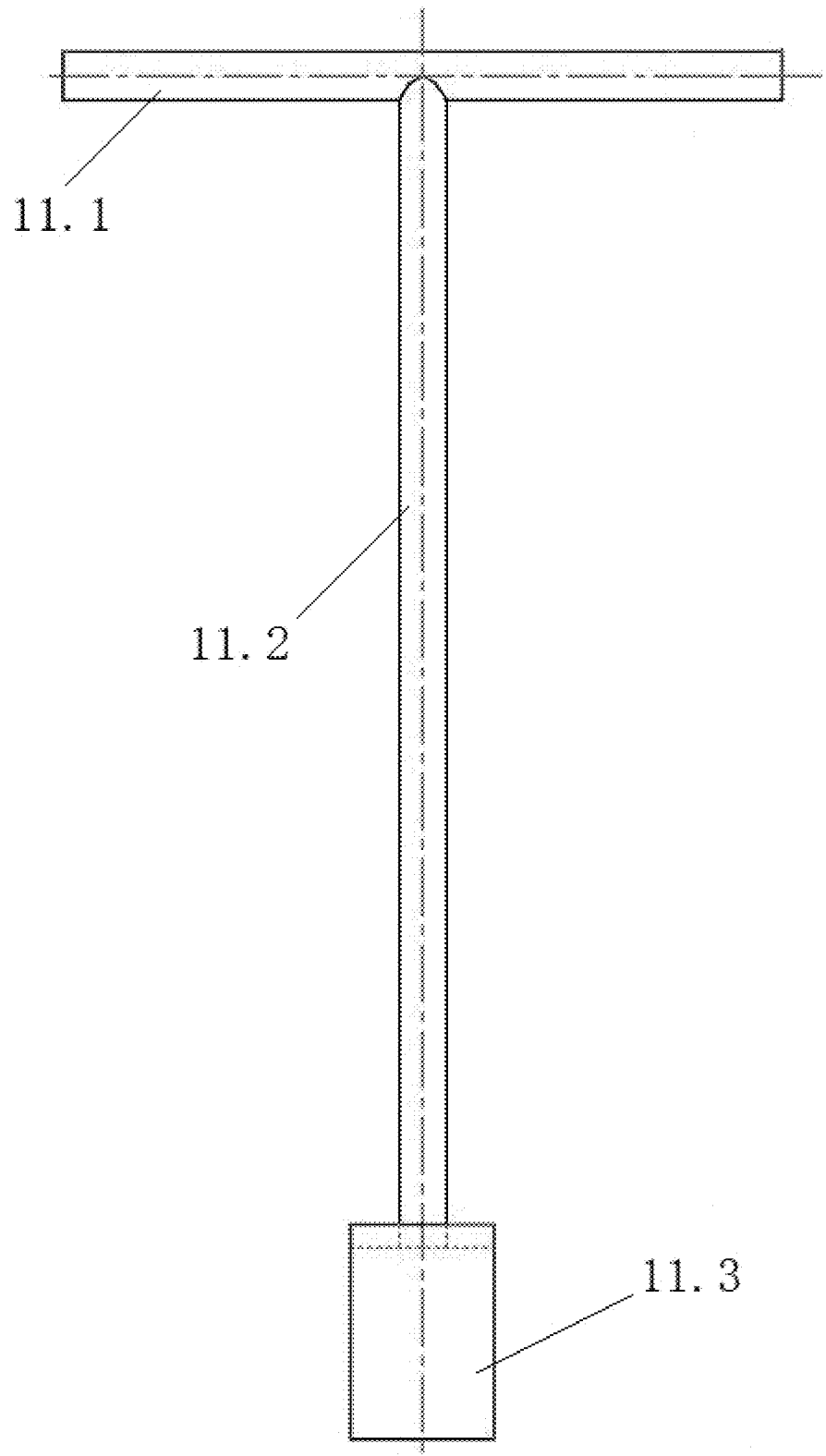
FIG. 2 is a front view of a male connector mounting tool.
Figure 3:
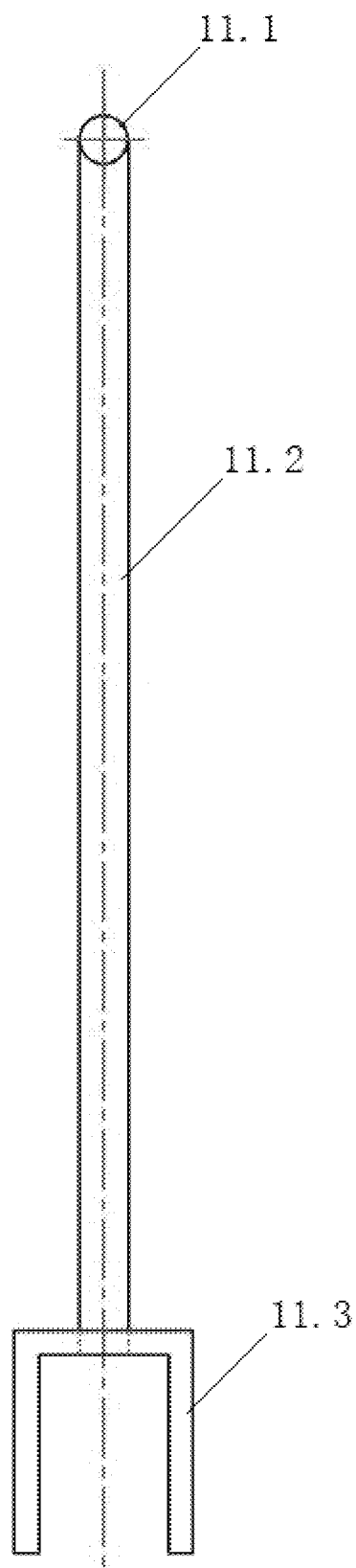
FIG. 3 is a side view of a male connector mounting tool.
Figure 4:
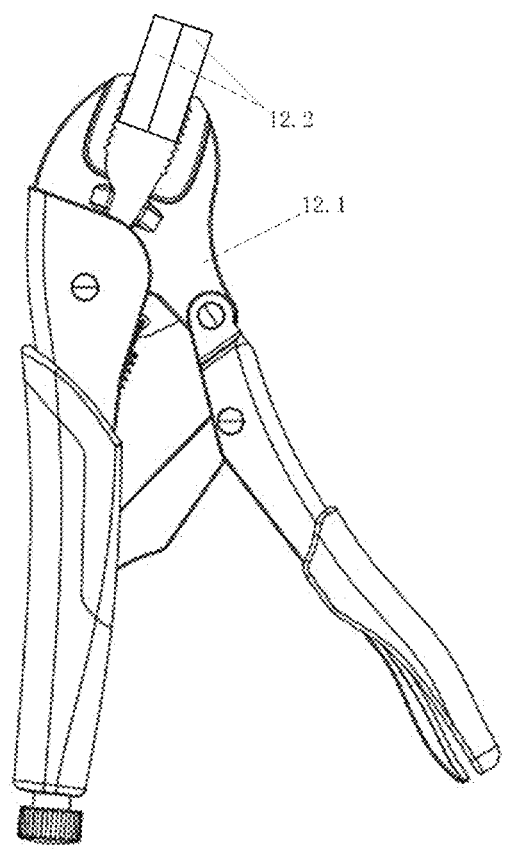
FIG. 4 is a front view of a female connector mounting tool.
Figure 5:
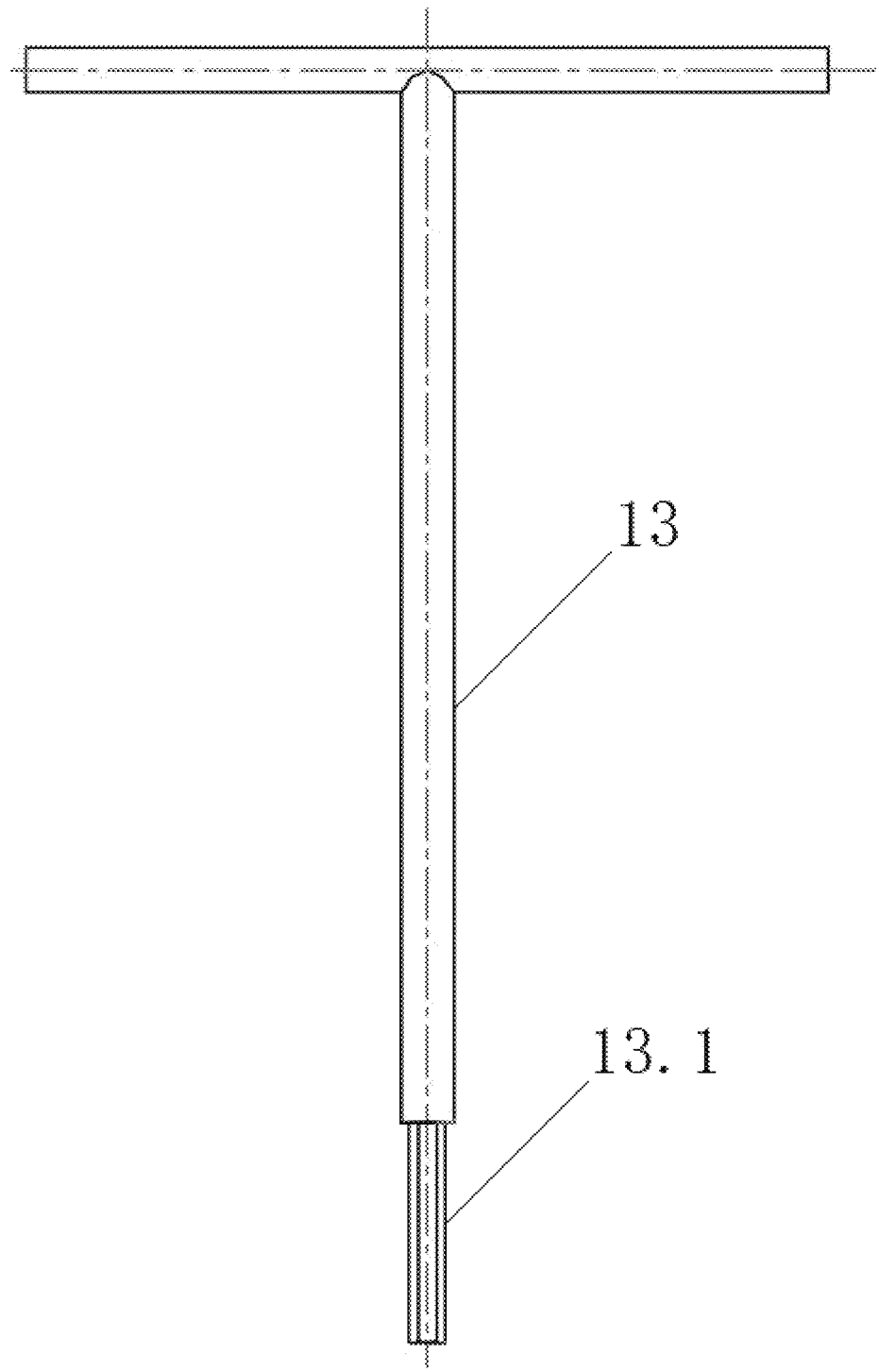
FIG. 5 is a front view of the communication cable connector mounting tool.

In the drawings: 1—conductive spring; 2—communication cable direct connector; 3—circlips for hole; 4—insulating male connector; 5—insulating wire tube; 6—communication cable copper core; 7—three-wing stabilizing frame; 8—stainless steel retaining ring; 9—communication cable tapered connector; 10—insulating female connector; 11.1—grip; 11.2—connecting rod; 11.3—clamping plate; 12.1—fish-lip pincer; 12.2—arc-shaped clamping plate; 13—T-shaped rod; 13.1—hexagon.

DETAILED DESCRIPTION OF ILLUSTRATIVE EMBODIMENTS

The technical solutions of the present application are clearly and completely described in the following with reference to the accompanying drawings. Apparently, the described embodiments are a part rather than all of the embodiments of the present invention. All other embodiments obtained by persons of ordinary skill in the art based on the embodiments of the present application without creative efforts shall belong to the scope of protection of the present invention.

The present embodiment provides a method for mounting a central communication cable assembly of a directional drill rod, in which tools required to be used include an air gun, a brush, cotton cloth, a spring caliper, a male connector mounting tool, a female connector mounting tool, a fish-lip pincer, etc.

The male connector mounting tool includes a grip 11.1, a connecting rod 11.2 and a clamping plate 11.3, the clamping plate 11.3 including two side plates arranged opposite each other and a connecting plate connecting the two side plates, the distance between the side plates matching the large diameter end of the insulating male connector, and the connecting rod 11.2 being connected to the grip 11.1 and the clamping plate 11.3.

The female connector mounting tool includes a fish-lip pincer 12.1 and two arc-shaped clamping plates 12.2 provided on the mouth of the fish-lip pincer 12.1, and the inner diameter of the arc-shaped clamping plates 12.2 matching the large-diameter end of the insulating female connector.

The communication cable connector mounting tool includes a T-shaped rod 13, and a vertical end portion is a hexagon 13.1 matching a hexagonal hole of the communication cable connector.

Specifically, the method includes the following steps:
1. checking whether the model and specifications of the parts of the communication cable assembly to be assembled and the drill rod are consistent and intact, whether the number is accurate, and whether the mounting tools are intact;
2. using an air gun, a brush and cotton cloth to clean parts of the communication cable assembly to be assembled and placing same on a clean assembling platform in categories;
3. according to drawing requirements, mounting an O-shaped sealing member in a sealing groove of an insulating male connector (plastic material), an insulating female connector (plastic material), a communication cable direct connector (stainless steel material) and a communication cable tapered connector (stainless steel material);
4. cleaning the interior and exterior, the groove and threads of the drill rod with the air gun and the brush;
5. placing the drill rod horizontally on an assembly table, and pushing a three-wing stabilizing frame made of rubber material into a drill rod hole;
6. using a spring caliper (pneumatically or manually) to respectively mount two circlips for hole (snap springs) into snap spring grooves located at two ends inside a drill rod hole, and after mounting, carefully checking whether the snap springs are completely and reliably inserted into the snap spring grooves;

7. inserting a long threaded end of the insulating wire tube into a central hole of the three-wing stabilizing frame until the remaining length of the insulating wire tube is 20 cm-30 cm;
8. sleeving a central hole of a stainless steel retaining ring I into a short threaded end of the insulating wire tube;
9. using the fish-lip pincer to clamp and fix the non-threaded portion of the insulating wire tube located outside the central hole of the three-wing stabilizing frame, abutting the small-diameter end of the insulating male connector with the short threaded end of the insulating wire tube and then pressing the small-diameter end into the short threaded end, the pressing process being performed slowly, so as to prevent the O-shaped sealing member in the insulating male connector hole from being extruded and scratched by the threaded portion of the insulating wire tube, rotating the insulating male connector by a hand, after the threads of the insulating male connector are normally screwed into the short threaded end of the insulating wire tube, clamping the large-diameter end of the insulating male connector by means of the clamping plate of the male connector mounting tool, and rotating the insulating male connector forward until the insulating male connector is tightened, the torque being 10 N·m;
10. checking visually whether the O-shaped sealing member where the mounted insulating male connector and the insulating wire tube are connected is intact, the insulating male connector being made of translucent plastic, so that the state of the black O-shaped sealing member can be observed;
11. holding the insulating male connector with a hand, pushing same together with the insulating wire tube and the stainless steel retaining ring I into the drill rod hole until the stainless steel retaining ring I is clamped outside the circlip for hole at this side;
12. sleeving a central hole of a stainless steel retaining ring II into the long threaded end of the insulating wire tube;
13. fixing the insulating male connector by means of the clamping plate of the male connector mounting tool, abutting the small-diameter end of the insulating female connector with the long threaded end of the insulating wire tube and then pressing the small-diameter end into the long threaded end the pressing process being performed slowly, so as to prevent the O-shaped sealing member in the insulating male connector hole from being extruded and scratched by the threaded portion of the insulating wire tube, rotating the insulating female connector by a hand, and after the threads of the insulating female connector are normally screwed into the long threaded end of the insulating wire tube, clamping the large-diameter end of the insulating female connector by means of the arc-shaped clamping plates of the female connector mounting tool, rotating the insulating female connector forward until the insulating female connector is tightened, the stainless steel retaining ring II is clamped outside the circlip for hole at this side, the gap between the insulating female connector and the stainless steel retaining ring II is completely eliminated, the torque being 10 N·m.
14. shaking the insulating connectors at two ends by hands with a large force, in which there should be no significant movement gap;
15. inserting a communication cable copper core into the hole of the insulating wire tube from a central hole of the insulating male connector or the insulating female connector, leaving a length of 20 cm-30 cm to expose an end face of the large-diameter end of the insulating connectors;
16. coating a Loctite 263 thread fastening agent onto a position between the threaded end face and the third thread of the first end of the communication cable copper core, coating the remaining threads with the oxidation-resistant active thread conductive paste, clamping and fixing the non-threaded portion on the first end of the communication cable copper core by using a fish-lip pincer, and mounting the communication cable connector (one of a straight hole and a tapered hole) including first, rotating the communication cable connector by a few threads forward by a hand, and then inserting a vertical end portion of the communication cable connector mounting tool into the hexagonal hole of the communication cable connector, and screwing the communication cable connector, the torque being 2 N·m;
17. pushing the mounted communication cable connector and communication cable copper core into the corresponding insulating connector until the gap between the communication cable connector and the insulating connector is eliminated, and at this time, the end face of the communication cable connector being flush with the mating face of the insulating connector at this end;
18. dropping a Loctite 263 thread fastening agent into the threaded hole of the unmounted communication cable connector vertically upward, coating the oxidation-resistant active thread conductive paste onto the threads after the third thread at the second end of the communication cable copper core, inserting the vertical end portion of the communication cable connector mounting tool into the hexagonal hole of the mounted communication cable connector to fix the mounted communication cable connector, and then taking another communication cable connector mounting tool to screw the threaded hole of the unmounted communication cable connector with the threaded section of the second end of the communication cable copper core, the torque being 2 N·m, and the screwing being performed only after threads are aligned carefully, so as to prevent damage;
and 19. after the stainless steel communication cable connector is mounted, inserting the cylindrical end of the conductive spring into the cylindrical hole of the communication cable direct connector, and then reversely rotating and pressed same, in which if the friction is large, a needle-nose plier can be used for clamping carefully so as to assist in reversely rotating and pressing.

The present embodiments further provide a method for testing a central communication cable assembly of a directional drill rod, including the following steps:

S1, a primary test:

testing, by means of a multimeter (adjusted to a buzzer on-off gear) and a copper wire (≥1.5 mm$^2$) mounted with an alligator clip, that the mounted central communication cable assembly of a directional drill rod is in an on state, in which the multimeter measures whether a resistance value reading between the communication cable connectors at two ends of a single drill rod of three meters is less than or equal to 0.5Ω (the multimeter is calibrated before measurement, displaying readings minus the meter internal resistance), and if so, the central communication cable assembly of a directional drill rod is qualified, and if the resistance exceeds a limit, the central communication cable assembly of a directional drill rod needs to be dismounted to investigate and analyze the fault reason, and record and upload same;

checking whether the mounting direction of the male and female insulating connectors and the conductive spring complies with the requirements of a production task list;

visually inspecting the concentricity of the insulating connectors and the inner hole of the drill rod, in which there should be no significant visual error; and performing production recording according to the serial number of the drill rod and registering the data for archiving;

S2, according to a production batch, performing a random product inspection on the qualified central communication cable assembly of a directional drill rod, wherein the rack inspection including a pull-out force test, a high-low temperature adaptability test, a static conduction performance test, a hydrostatic pressure sealing performance test, and a static insulation performance test of the communication cable assembly;

1. the pull-out force test of the communication cable assembly:

the test object is to check the mechanical strength of the communication cable assembly, and by means of this test, problems such as material defects, machining tolerances and assembly errors can be checked; the test method: using a pull-out test machine, fixing a tube body of a tested set of drill rod, clamping an insulating male connector and an insulating female connector and applying an axial traction force of 1000 N for 1 min, and then disassembling the tested drill rod and performing measurement, wherein in the test, no significant deformation or fracture situation should occur in each component of the central communication cable assembly of a directional drill rod;

2. the high-low temperature adaptability test:

the test object: the thermal expansion coefficient of a polymer material is large, and the matching change of tolerances of the polymer/metal components in a high-low temperature environment is examined, and the quality control effect of modification of each batch of the polymer material is monitored;

the test method: using a man-made space temperature for testing; placing the tested set of drill rod in a sealed test bin, wherein the various components of the drill rod should not have significant deformation and fracture in a temperature range of −25° C. to 50° C., and a change in the matching size of the insulating male connector and the insulating female connector is recorded every time the ambient temperature changes by 5° C.;

3. the static conduction performance test:

the test object: a rough approximate value internal resistance is obtained by using a multimeter in 22 gear for measurement in a production process, and a range of a resistance value of conducting components is randomly inspected and checked, so as to avoid a decrease in signal transmission efficiency due to a manufacturing defect or a loss of control of an assembly product, thereby causing communication signal attenuation, distortion and loss;

the test method: performing a retest by using an electric bridge tester, and connecting and measuring the three sets of drill rods of the same model, wherein the internal resistance of a single drill rod of three meters should be less than or equal to 0.5 Ω;

4. the static insulation performance test:

the test object: detecting the insulating dielectric performance of conductive components and the exterior, so as to avoid poor insulating dielectric performance caused by the quality of an insulating material or a component mounting error, thereby causing a signal transmission fault;

the test method: using a high-voltage pulse generator to test the insulation performance of a conducting component and a housing;

5. the hydrostatic pressure sealing performance test:

the test object: testing the function of a sealing member, so as to avoid a batch quality accident caused by factors such as component materials, tolerance fitting, assembling errors, etc.;

the test method: connecting three sets of drill rods in the same specification in a threaded manner, mounting test flanges at two ends, using a hydraulic pressure gauge to apply a 12 MPa water pressure to the tested drill rod set, and measuring and recording a pressure gauge and a leakage condition at a threaded connection portion, if the total leakage amount in 10 minutes when the pressure is held is less than or equal to 5 ml, the tested drill rods being qualified;

performing the static insulation performance test after the time for holding the pressure ends;

and disassembling the communication cable assembly, and if there is no water stain in holes of the insulating male connector and the insulating female connector and an insulating wire tube, the central communication cable assembly of a directional drill rod being qualified.

Finally, it should be noted that the described embodiments are merely intended for describing the technical solutions of the present invention, but not intended to limit the present invention. Although the present application is described in detail with reference to the described embodiments, persons of ordinary skill in the art should understand that they may still make modifications to the technical solutions described in the described embodiments, or make equivalent replacements to some or all technical features thereof; and these modifications or replacements do not make the essence of the corresponding technical solutions depart from the scope of the technical solutions of the embodiments of the present invention.

What is claimed is:

1. A method for mounting a central communication cable assembly of a directional drill rod, comprising the following steps:

S1, according to drawing requirements, mounting an O-shaped sealing member in a sealing groove of an insulating male connector, an insulating female connector, a communication cable direct connector and a communication cable tapered connector;

S2, cleaning the interior and exterior of the drill rod, the groove and threads;

S3, placing the drill rod horizontally on an assembly table, and pushing a three-wing stabilizing frame made of rubber material into a drill rod hole;

S4, using a spring caliper to respectively mount two circlips for hole into snap spring grooves located at two ends inside the drill rod hole;

S5, inserting a long threaded end of an insulating wire tube into a central hole of the three-wing stabilizing frame until the remaining length of the insulating wire tube outside the hole reaches a preset value;

S6, sleeving a central hole of a stainless steel retaining ring I into a short threaded end of the insulating wire tube;

S7, fixing a non-threaded portion of the insulating wire tube located outside the central hole of the three-wing stabilizing frame, abutting a small-diameter end of the insulating male connector with the short threaded end of the insulating wire tube and then pressing the small-diameter end into the short threaded end, rotating the insulating male connector, and after threads of the insulating male connector are normally screwed into the short threaded end of the insulating wire tube, rotating the insulating male connector until the insulating male connector is tightened;

S8, checking whether the O-shaped sealing member at the connection position of the mounted insulating male connector and insulating wire tube is in good condition, if so, proceeding to the next step, otherwise, disassembling the insulating male connector, and performing re-mounting same according to step S7;

S9, holding the insulating male connector with a hand, pushing same together with the insulating wire tube and the stainless steel retaining ring I into the drill rod hole until the stainless steel retaining ring I is clamped outside the circlip for hole at this side;

S10, sleeving a central hole of a stainless steel retaining ring II into the long threaded end of the insulating wire tube;

S11, fixing the insulating male connector, abutting a small-diameter end of the insulating female connector with the long threaded end of the insulating wire tube and then pressing the small-diameter end into the long threaded end, rotating the insulating female connector, and after threads of the insulating female connector are normally screwed into the long threaded end of the insulating wire tube, rotating the insulating female connector until the insulating female connector is tightened and the stainless steel retaining ring II is clamped outside the circlip for hole at this side;

S12, inserting a communication cable copper core into the hole of the insulating wire tube from a central hole of the insulating male connector or the insulating female connector, wherein the length outside end faces of large-diameter ends of the insulating connectors at two ends is a preset value;

S13, coating a thread fastening agent onto a position between a thread end face and an nth thread of a first end of the communication cable copper core, wherein n is a positive integer less than the total number of threads of the first end or a second end of the communication cable copper core, and the remaining threads are coated with an oxidation-resistant active thread conductive paste so as to fill the threads; fixing a non-threaded portion on the first end of the communication cable copper core; and screwing a threaded hole of the communication cable direct connector or the communication cable tapered connector with a threaded section of the first end of the communication cable copper core;

S14, pushing the mounted communication cable connector and communication cable copper core into the corresponding insulating connector until a gap between the communication cable connector and the insulating connector is eliminated, and at this time, an end face of the communication cable connector being flush with a mating face of the insulating connector at this end;

S15, dropping the thread fastening agent into a threaded hole of an unmounted communication cable connector vertically upwards, and coating the oxidation-resistant active thread conductive paste on threads after an nth thread of the second end of the communication cable copper core, fixing the mounted communication cable connector, and screwing the threaded hole of the unmounted communication cable connector with a threaded section of the second end of the communication cable copper core, until the gap between the communication cable connector and the insulating connector is eliminated, at this time, the end face of the communication cable connector being flush with the mating face of the insulating connector at this end; and S16, mounting a cylindrical end of a conductive spring into a cylindrical hole of the communication cable direct connector.

2. The method for mounting a central communication cable assembly of a directional drill rod according to claim 1, steps S7 and S11 further comprising using a male connector mounting tool to clamp the insulating male connector, wherein the male connector mounting tool comprises a grip, a connecting rod and a clamping plate;

the clamping plate comprises two side plates arranged opposite to each other and a connecting plate connecting the two side plates, and a distance between the side plates matches the large-diameter end of the insulating male connector; and the connecting rod is connected to the grip and the clamping plate.

3. The method for mounting a central communication cable assembly of a directional drill rod according to claim 2, step S11 further comprising using a female connector mounting tool to clamp the insulating female connector, wherein the female connector mounting tool comprises a fish-lip pincer and two arc-shaped clamping plates provided on a mouth of the fish-lip pincer; and the inner diameter of the arc-shaped clamping plates matches the large-diameter end of the insulating female connector.

4. The method for mounting a central communication cable assembly of a directional drill rod according to claim 3, step S7 further comprising using the fish-lip pincer to clamp and fix the non-threaded portion of the insulating wire tube located outside the central hole of the three-wing stabilizing frame, abutting the small-diameter end of the insulating male connector with the short threaded end of the insulating wire tube and then pressing the small-diameter end into the short threaded end, rotating the insulating male connector by a hand, after the threads of the insulating male connector are normally screwed into the short threaded end of the insulating wire tube, clamping the large-diameter end of the insulating male connector by means of the clamping plate of the male connector mounting tool, and rotating the insulating male connector forward until the insulating male connector is tightened, the torque being 10 N·m.

5. The method for mounting a central communication cable assembly of a directional drill rod according to claim 4, step S11 further comprising fixing the insulating male connector by means of the clamping plate of the male connector mounting tool, abutting the small-diameter end of the insulating female connector with the long threaded end of the insulating wire tube and then pressing the small-diameter end into the long threaded end, rotating the insulating female connector by a hand, and after the threads of the insulating female connector are normally screwed into the long threaded end of the insulating wire tube, clamping the large-diameter end of the insulating female connector by means of the arc-shaped clamping plates of the female connector mounting tool, rotating the insulating female connector forward until the insulating female connector is tightened, the stainless steel retaining ring II is clamped outside the circlip for hole at this side, and a gap between the insulating female connector and the stainless steel retaining ring II is completely eliminated, the torque being 10 N·m.

6. The method for mounting a central communication cable assembly of a directional drill rod according to claim 5, steps S13 and S15 further comprising using a communication cable connector mounting tool to mount the communication cable connector, wherein the communication cable connector mounting tool comprises a T-shaped rod, and a vertical end portion is a hexagon matching a hexagonal hole of the communication cable connector.

7. The method for mounting a central communication cable assembly of a directional drill rod according to claim 6, step S13 further comprising coating a Loctite 263 thread fastening agent onto a position between the threaded end face and the third thread of the first end of the communication cable copper core, coating the remaining threads with the oxidation-resistant active thread conductive paste, clamping and fixing the non-threaded portion on the first end of the communication cable copper core by using a fish-lip pincer, and mounting the communication cable connector comprising first rotating the communication cable connector by a few threads forward by a hand, and then inserting a vertical end portion of the communication cable connector mounting tool into the hexagonal hole of the communication cable connector, and screwing the communication cable connector, the torque being 2 N·m.

8. The method for mounting a central communication cable assembly of a directional drill rod according to claim 7, step S15 further comprising dropping the Loctite 263 thread fastening agent into the threaded hole of the unmounted communication cable connector vertically upward, coating the oxidation-resistant active thread conductive paste onto threads after the third thread at the second end of the communication cable copper core, inserting the vertical end portion of the communication cable connector mounting tool into the hexagonal hole of the mounted communication cable connector to fix the mounted communication cable connector, and then taking another communication cable connector mounting tool to screw the threaded hole of the unmounted communication cable connector with the threaded section of the second end of the communication cable copper core, the torque being 2 N·m.

9. A method for testing a central communication cable assembly of a directional drill rod, comprising the following steps:
S1, testing, by means of a multimeter and a copper wire mounted with an alligator clip, that the mounted central communication cable assembly of a directional drill rod is in an on state, wherein the multimeter measures whether a resistance value reading between the communication cable connectors at two ends of a single drill rod of three meters is less than or equal to 0.5Ω, and if so, the central communication cable assembly of a directional drill rod is qualified, and if the resistance exceeds a limit, the central communication cable assembly of a directional drill rod needs to be dismounted to investigate and analyze the fault reason;

S2, according to a production batch, performing a random product inspection on the qualified central communication cable assembly of a directional drill rod, wherein a rack inspection comprises a pull-out force test, a high-low temperature adaptability test, a static conduction performance test, a hydrostatic pressure sealing performance test, and a static insulation performance test of the communication cable assembly;

the pull-out force test of the communication cable assembly: using a pull-out test machine, fixing a tube body of a tested set of drill rod, clamping an insulating male connector and an insulating female connector and applying an axial traction force of 1000 N for 1 min, and then disassembling the tested drill rod and performing measurement, wherein in the test, no significant deformation or fracture situation should occur in each component of the central communication cable assembly of a directional drill rod;

the high-low temperature adaptability test: placing the tested set of drill rod in a sealed test bin, wherein the various components of the drill rod should not have significant deformation and fracture in a temperature range of −25° C. to 50° C., and a change in a matching size of the insulating male connector and the insulating female connector is recorded every time the ambient temperature changes by 5° C.;

the static conduction performance test: performing a retest by using an electric bridge tester, and connecting and measuring three sets of drill rods of the same model, wherein the internal resistance of a single drill rod of three meters should be less than or equal to 0.5 Ω;

the static insulation performance test: using a high-voltage pulse generator to test the insulation performance of a conducting component and a housing;

the hydrostatic pressure sealing performance test: connecting three sets of drill rods in the same specification in a threaded manner, mounting test flanges at two ends, using a hydraulic pressure gauge to apply a 12 MPa water pressure to the tested drill rod set, and measuring and recording a pressure gauge and a leakage condition at a threaded connection portion, if the total leakage amount in 10 minutes when the pressure is held is less than or equal to 5 ml, the tested drill rods being qualified, performing the static insulation performance test after the time for holding the pressure ends, then disassembling the central communication cable assembly of a directional drill rod, and if there is no water stain in holes of the insulating male connector and the insulating female connector and an insulating wire tube, the central communication cable assembly of a directional drill rod being qualified.

* * * * *